United States Patent
Peters et al.

(10) Patent No.: US 11,873,047 B2
(45) Date of Patent: Jan. 16, 2024

(54) VIBRATION DAMPENING DEVICE FOR MOUNTING A HANDHELD ELECTRONIC DEVICE

(71) Applicant: ANNEX PRODUCTS PTY. LTD., Prahran (AU)

(72) Inventors: Christopher L. Peters, Glen Iris (AU); Leigh M. Ryan, Sandringham (AU)

(73) Assignee: ANNEX PRODUCTS PTY LTD, South Yarra (AU)

( * ) Notice: Subject to any disclaimer, the term of this patent is extended or adjusted under 35 U.S.C. 154(b) by 317 days.

(21) Appl. No.: 17/336,909

(22) Filed: Jun. 2, 2021

(65) Prior Publication Data

US 2021/0380188 A1 Dec. 9, 2021

Related U.S. Application Data (60) Provisional application No. 63/035,115, filed on Jun. 5, 2020.

(51) Int. Cl.
*B62J 11/00* (2020.01)
*F16F 15/08* (2006.01)

(52) U.S. Cl.
CPC ............... *B62J 11/00* (2013.01); *F16F 15/08* (2013.01); *F16F 2230/007* (2013.01)

(58) Field of Classification Search
CPC ............................. F16F 15/08; F16F 2230/007
USPC ....................................................... 248/638
See application file for complete search history.

(56) References Cited

U.S. PATENT DOCUMENTS

| 4,826,379 A | * | 5/1989 | Norden | F16B 37/0842 |
| | | | | 411/908 |
| 4,892,051 A | | 1/1990 | Taylor | |
| 4,943,019 A | | 7/1990 | Mester | |
| 5,306,121 A | * | 4/1994 | Heflin | F16F 15/08 |
| | | | | 417/363 |
| 5,312,030 A | * | 5/1994 | Baravalle | B60R 9/058 |
| | | | | 224/324 |
| 6,354,750 B1 | | 3/2002 | Romanoff | |
| 6,640,941 B2 | | 11/2003 | Taylor | |
| 6,773,001 B2 | | 8/2004 | Saiki et al. | |
| 6,776,488 B2 | | 8/2004 | Burbulla | |

(Continued)

FOREIGN PATENT DOCUMENTS

| CN | 102943839 | 5/2014 |
| CN | 105909725 | 2/2018 |

(Continued)

OTHER PUBLICATIONS

English translation of WO2021/134584, retrieved from EPO website. (Year: 2019).*

(Continued)

*Primary Examiner* — Scott T Mcnurlen
(74) *Attorney, Agent, or Firm* — Barnes & Thornburg LLP (57) ABSTRACT

A vibration dampening device for a mount including a mount head and a base for mounting a handheld device on a bicycle. The vibration dampening device comprises a chassis and one or more vibration dampening grommets. The chassis comprises first and second interlocking pieces configured to be disposed between the mount head and the base moveable relative to each other. The chassis includes structure for limiting movement of the first and second interlocking pieces relative to each other.

24 Claims, 8 Drawing Sheets

(56) References Cited

U.S. PATENT DOCUMENTS

| | | |
|---|---|---|
| 6,820,980 B1 | 11/2004 | Romanoff et al. |
| 7,101,045 B2 | 9/2006 | Romanoff et al. |
| 7,121,745 B2 | 10/2006 | Chapman |
| 7,128,479 B2 | 10/2006 | Chapman |
| 7,967,282 B2 | 6/2011 | Boyd et al. |
| 8,033,742 B1 | 10/2011 | Chapman |
| 8,061,677 B2 | 11/2011 | Johnson et al. |
| 8,261,954 B2 | 9/2012 | Lee |
| 8,333,520 B1 | 12/2012 | Cronin et al. |
| 8,376,292 B2 | 2/2013 | Cicco |
| 8,540,438 B1 | 9/2013 | Cronin et al. |
| 8,602,277 B2 | 12/2013 | Lee |
| 8,613,379 B2 | 12/2013 | Lee |
| 9,019,698 B2 | 4/2015 | Theirs |
| 9,033,596 B2 | 5/2015 | Samuels |
| 9,071,810 B2 | 6/2015 | Willenborg |
| 9,243,739 B2 | 1/2016 | Peters |
| 9,247,795 B2 | 2/2016 | Kim |
| 9,540,065 B2 | 1/2017 | Stageberg |
| 9,668,039 B2 | 5/2017 | Garfio et al. |
| 9,671,191 B1 | 6/2017 | Sullivan et al. |
| 9,751,680 B2 | 9/2017 | Kim |
| 9,777,793 B1 | 10/2017 | Chen et al. |
| 9,777,887 B2 | 10/2017 | Pan et al. |
| 9,835,934 B2 | 12/2017 | Matt |
| 9,872,546 B2 | 1/2018 | Kim |
| 9,874,308 B2 | 1/2018 | Saika et al. |
| 10,112,765 B2 | 10/2018 | Kim |
| 10,175,563 B2 | 1/2019 | Matt |
| D852,188 S | 6/2019 | He |
| D852,681 S | 7/2019 | Peters |
| D858,510 S | 9/2019 | Saculles |
| D859,286 S | 9/2019 | He |
| D860,114 S | 9/2019 | He |
| D861,669 S | 10/2019 | Bongard |
| D862,454 S | 10/2019 | Chun |
| D863,205 S | 10/2019 | Lin |
| D864,092 S | 10/2019 | Zhang |
| 10,426,238 B2 | 10/2019 | Kim |
| D865,750 S | 11/2019 | Richter |
| D865,751 S | 11/2019 | Richter |
| D870,094 S | 12/2019 | Ma |
| D870,718 S | 12/2019 | Peters |
| 10,508,683 B2 | 12/2019 | Chen et al. |
| D872,727 S | 1/2020 | Chung |
| D873,260 S | 1/2020 | Dang |
| D873,812 S | 1/2020 | Peters |
| D873,813 S | 1/2020 | Zhong |
| D874,385 S | 2/2020 | Jang |
| D876,316 S | 2/2020 | Peters |
| D877,138 S | 3/2020 | McSweyn |
| D877,688 S | 3/2020 | Liu |
| D879,090 S | 3/2020 | Chung |
| D889,383 S | 7/2020 | Wang |
| D940,125 S * | 1/2022 | Peters .................... D12/415 |
| 2011/0031203 A1 | 2/2011 | Chapman |
| 2012/0199620 A1* | 8/2012 | Gold .................... B62J 11/00 224/413 |
| 2012/0248166 A1* | 10/2012 | Gold .................... F16M 13/022 248/636 |
| 2012/0293930 A1 | 11/2012 | Schanz et al. |
| 2016/0037885 A1 | 2/2016 | Vito et al. |
| 2016/0081207 A1 | 3/2016 | Broadbent et al. |
| 2017/0152909 A1 | 6/2017 | Yoshii et al. |
| 2019/0009850 A1* | 1/2019 | Peters .................. H04B 1/3888 |
| 2019/0365067 A1 | 12/2019 | Kim |
| 2019/0366940 A1 | 12/2019 | Peters |
| 2019/0369664 A1 | 12/2019 | Peters |
| 2020/0116195 A1 | 4/2020 | Chen et al. |
| 2022/0333665 A1* | 10/2022 | Chan .................... B64C 39/024 |

FOREIGN PATENT DOCUMENTS

| | | | |
|---|---|---|---|
| CN | 207496955 U | 6/2018 | |
| CN | 108278309 A * | 7/2018 | .............. F16F 15/04 |
| CN | WO-2021/134584 * | 12/2019 | .............. B64D 47/00 |
| WO | WO 2015018236 | 2/2015 | |
| WO | WO 2015/149263 | 10/2015 | |

OTHER PUBLICATIONS

Annabelle Lahey, "Bicycle Bike Anti-vibration Camera Mount 15mm-31 mm Diameter Tube Fixed Bracket For GoPro Hero Xiaoyi 4k Sport Camera Outdoors Sport DJI," retrieved from internet at: https://annabellelahey.blogspot.com/2019/01/bicycle-bike-anti-vibration-camera.html, (Jan. 13 2019).

Search Report & Written Opinion issued in Appl. No. PCT/AUS2021/050551 (2021).

Farrat Resources, "Detailed Vibration Isolation Theory," accessed on the Internet at: https://www.farrat.com/resources/detailed-vibration-isolation-theory, on May 14, 2020.

SP Connect, "Moto Mount Pro," accessed on the Internet at: https://sp-connect.com/products/moto-mount-pro?variant=42332605546696, on May 14, 2020.

Xu et al., "Recent Advances in Multi-Dimensional Vibration Mitigation Materials and Devices," Frontiers in Materials, 14 pgs., vol. 6, Article 143 (Jul. 2019).

* cited by examiner

VIBRATION DAMPENING DEVICE FOR MOUNTING A HANDHELD ELECTRONIC DEVICE

CROSS REFERENCE TO RELATED APPLICATION

This application claims the benefit of priority under 35 U.S.C. § 119(e) to U.S. Provisional Patent Application No. 63/035,115, filed Jun. 5, 2020. The disclosure set forth in the referenced application is incorporated herein by reference in its entirety.

The present disclosure relates generally to a vibration dampening device for a mount for attaching a handheld electronic device to a bicycle or the like.

BACKGROUND

Numerous mounts have been developed to secure handheld electronic devices to a bicycle, motorcycle or the like. The mounts rigidly and releasably mount the handheld device to the bicycle, motorcycle or the like.

SUMMARY

The present disclosure is directed to a vibration dampening device for a mount including a mount head and a base for mounting a handheld device on a bike. The vibration dampening device comprises a chassis and one or more vibration dampening grommets. The chassis comprises first and second interlocking pieces configured to be disposed between the mount head and the base. The first interlocking piece is configured to engage the mount head and the second interlocking piece is configured to engage the base. The first interlocking piece includes a plurality of brackets, and the second interlocking piece includes a plurality of slots for receiving the brackets. The first and second interlocking pieces are moveable relative to each other. The chassis further comprises a stop for limiting movement of the first and second interlocking pieces relative to each other. The one or more vibration dampening grommets are engaged with the first and second interlocking pieces to provide dampening of vibrations incurred by the mount during movement of the bike. Each of the first and second interlocking pieces may include a plurality of arms. One of the grommets is engaged with one of the arms of the first interlocking piece and one of the arms of the second interlocking piece and another of the grommets is engaged with another of the arms of the first interlocking piece and another of the arms of the second interlocking piece. The arms of the first and second interlocking pieces extend in the same direction. Each of the first and second interlocking pieces may be bowl shaped. Each of said arms of the first and second interlocking pieces includes a portion extending away from the mount head. The stop may comprise a snap tab disposed on each bracket. The first and second interlocking pieces are moveable relative to each other along the brackets.

The first interlocking piece may include one or more spokes and the second interlocking piece may include a floor defining a bore to receive the spoke for limiting the movement of the first and second interlocking pieces relative to each other. The stop and the floor limit movement of the first and second interlocking pieces relative to each other in opposite directions. The brackets may extend parallel to an axis of the chassis and the spokes may extend radially from the axis. Each bracket and a respective spoke may be spaced along a same radial line from the axis. The stop and the floor limiting movement of the first and second interlocking pieces is relative to each other in opposite directions.

The brackets may be circumferentially spaced apart from each other. If there are three brackets and three spokes, for example, the brackets are spaced 120 degrees apart from each other and the spokes may be disposed 120 degrees apart from each other.

The vibration dampening device may also include a retention ring for limiting deflection of the brackets to prevent the brackets from passing entirely through the slots and separation of interlocking pieces. The vibration dampening device may include a plurality of snaps for engaging the retention ring and the protrusion and a plurality of alignment structures for positioning the ring.

Other aspects and advantages of the present disclosure will become apparent upon consideration of the following detailed description.

DETAILED DESCRIPTION

The present disclosure is directed to a vibration dampening device for a mount for attaching a cellular phone or other handheld electronic device to a handle bar or other structure of a bicycle, motorcycle or the like. While the present disclosure may be embodied in many different forms, several specific embodiments are discussed herein with the understanding that the present disclosure is to be considered only as an exemplification of the principles of the disclosure, and it is not intended to limit the disclosure to the embodiments illustrated.

Figure 1:
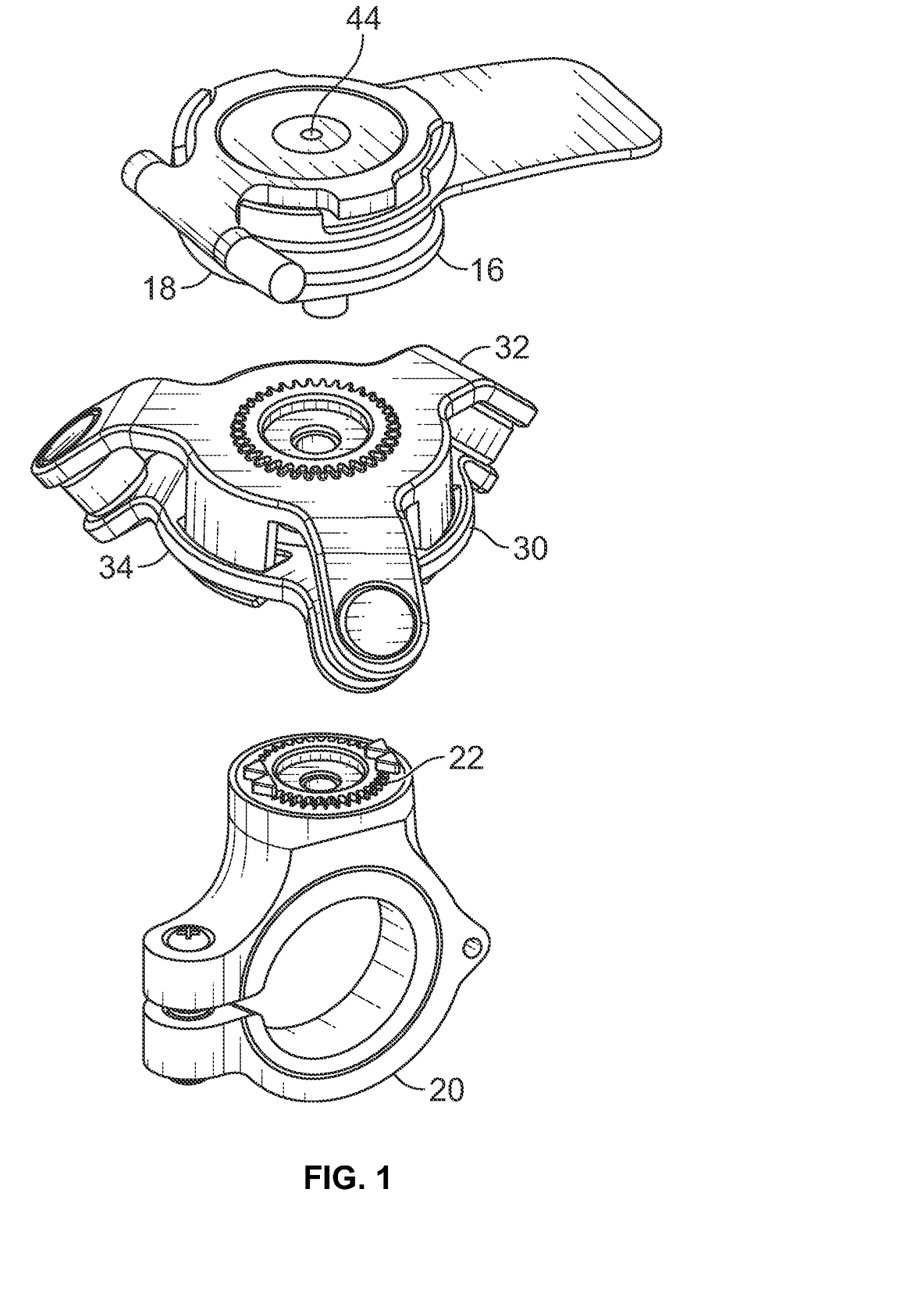
FIG. 1 is an exploded view of the vibration dampening device in accordance with an embodiment of the present disclosure, and a mount including a cellphone mount and a base mount.
Figure 2:
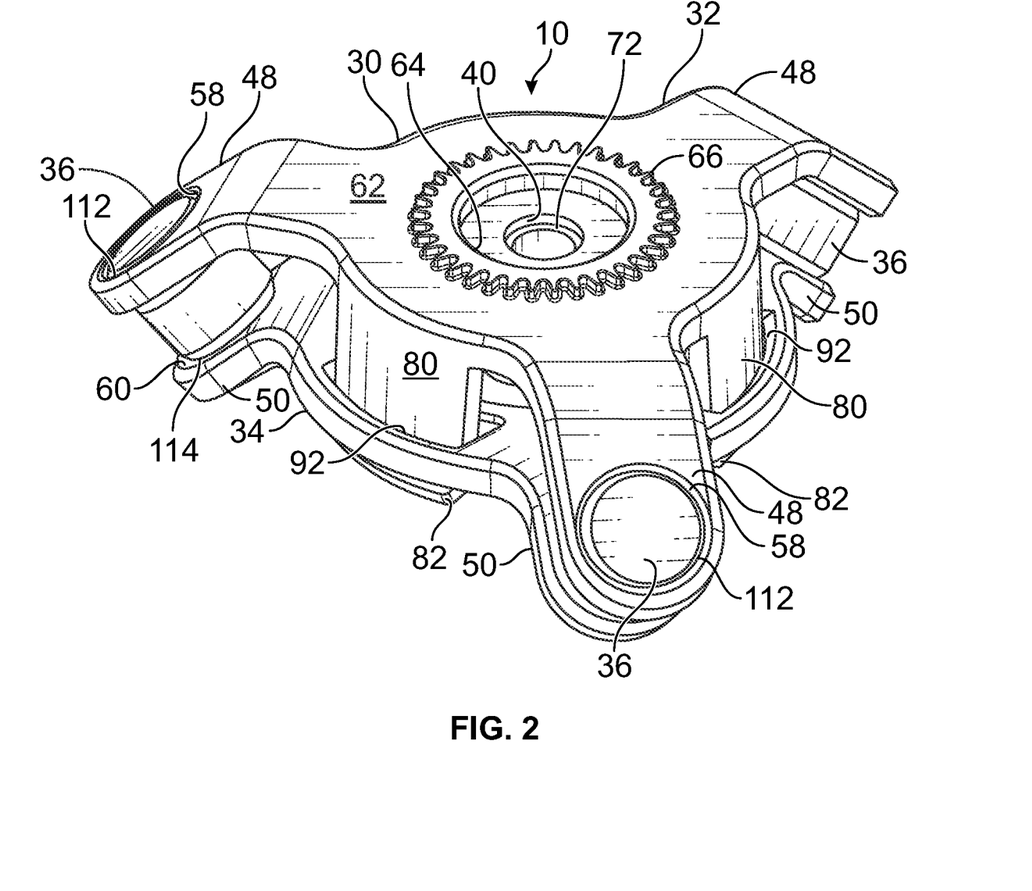
FIG. 2 is a top perspective view of a vibration dampening device of FIG. 1.
Figure 3:
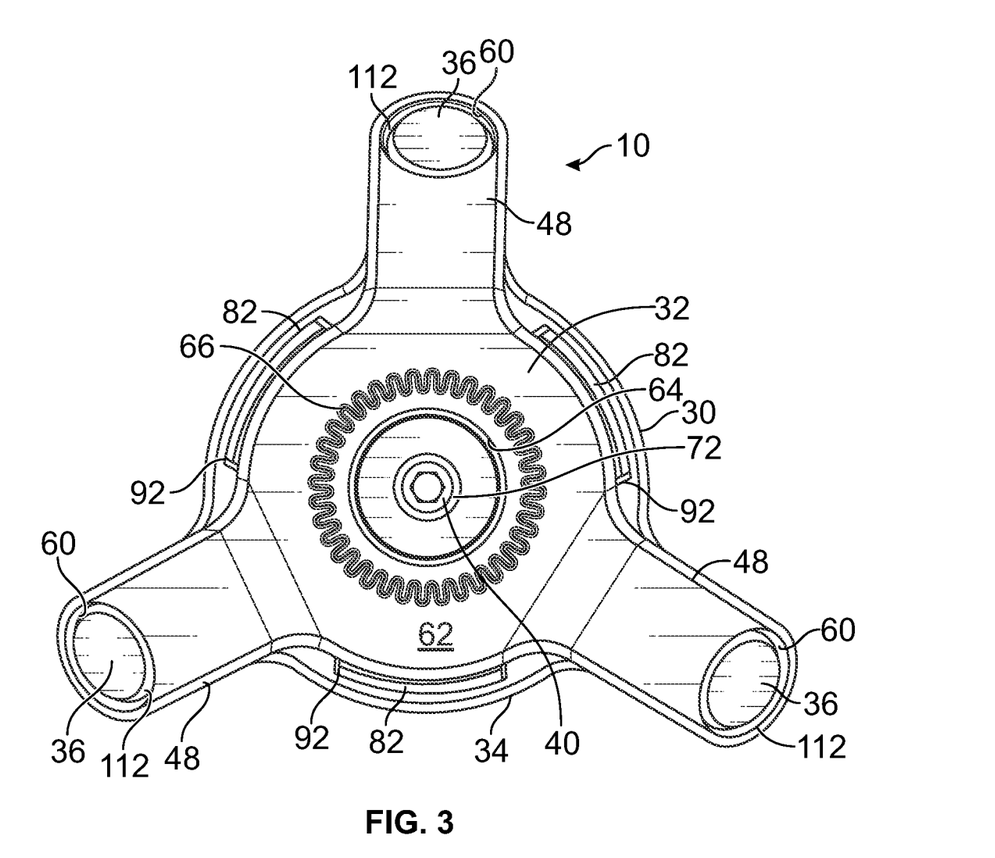
FIG. 3 is a top view of the vibration dampening device of FIG. 1.
Figure 4:
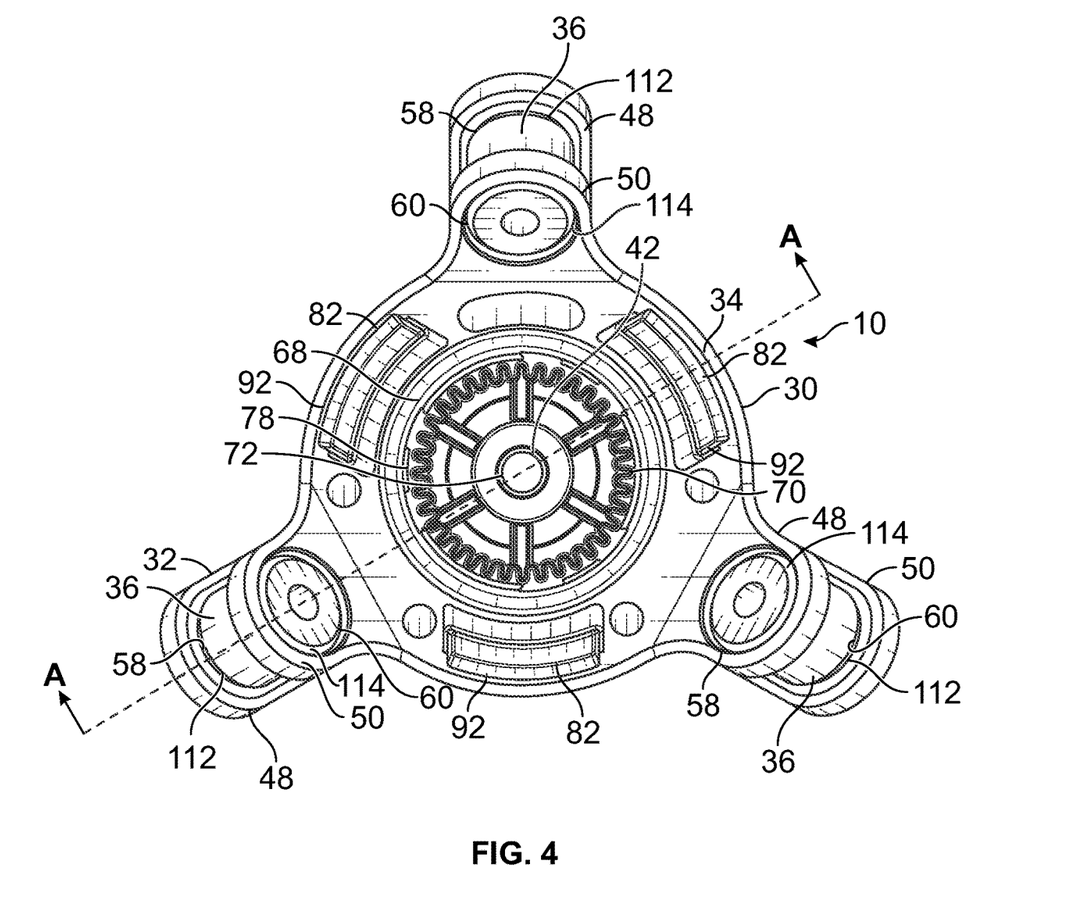
FIG. 4 is a bottom view of the vibration dampening device of FIG. 1.
Figure 5:
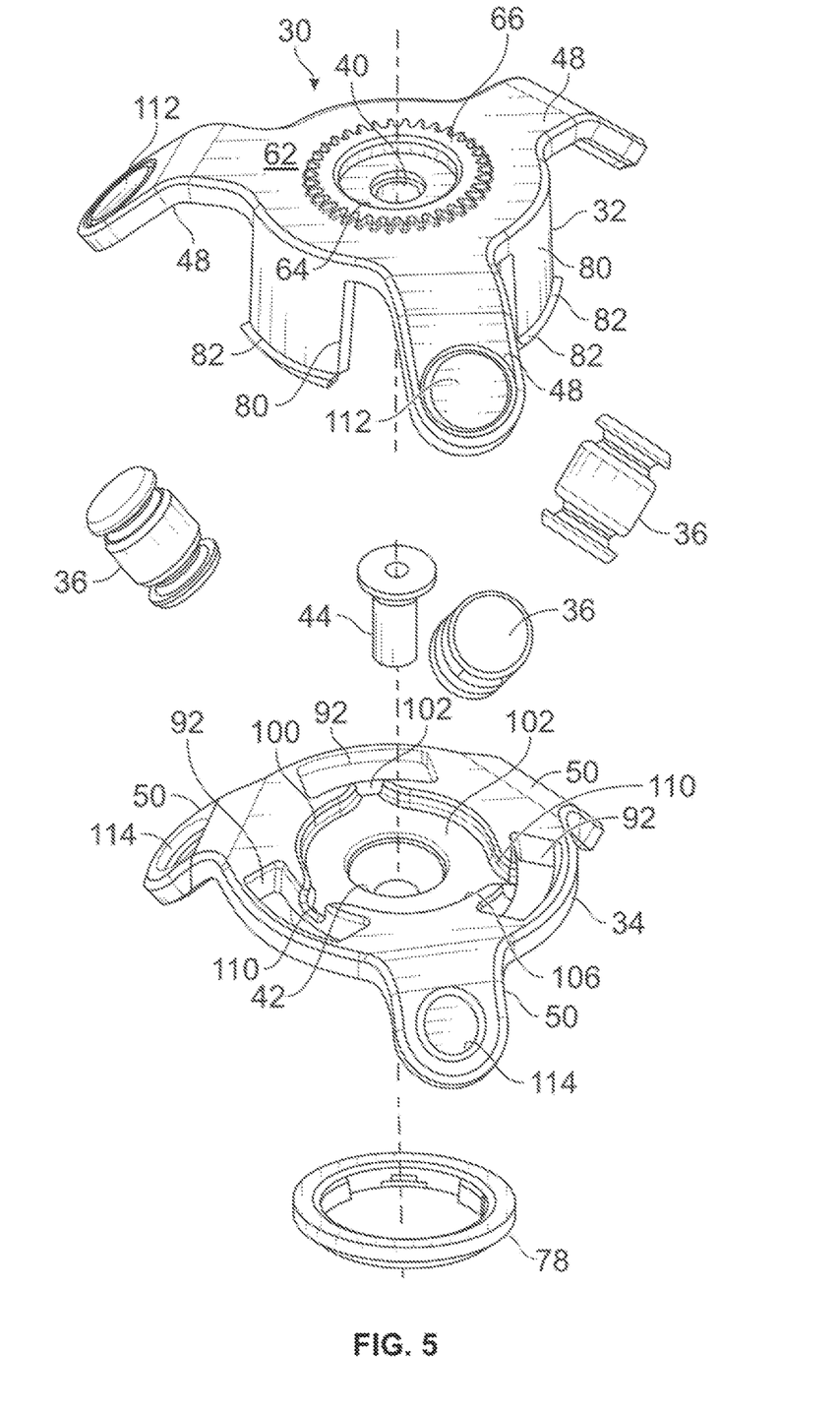
FIG. 5 is an exploded and top perspective view of the vibration dampening device of FIG. 1.
Figure 6:
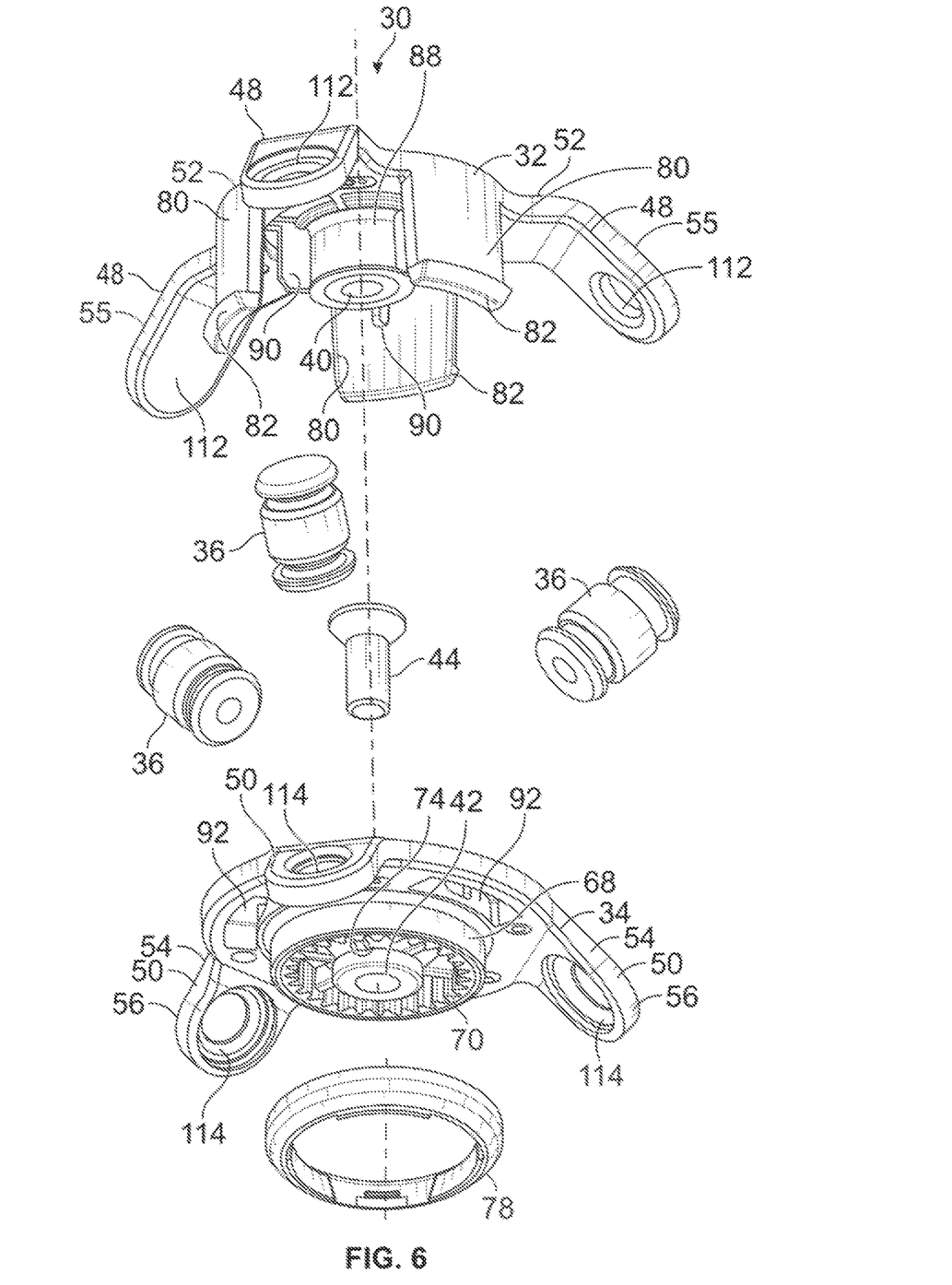
FIG. 6 is an exploded and bottom perspective view of the vibration dampening device of FIG. 1.
Figure 7:
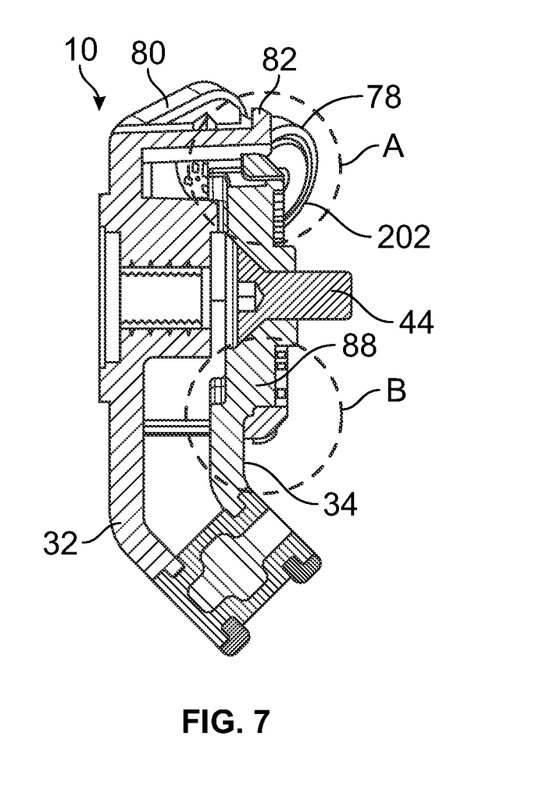
FIG. 7 is a section view taken along the lines A-A of FIG. 4.
Figure 7A:
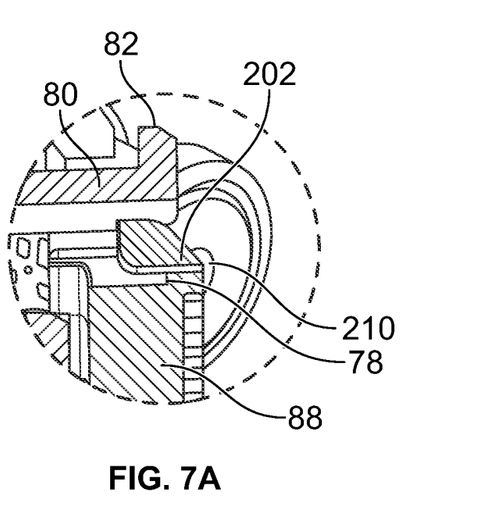
FIG. 7(a) is an enlarged partial view of detail A of FIG. 6.
Figure 7B:
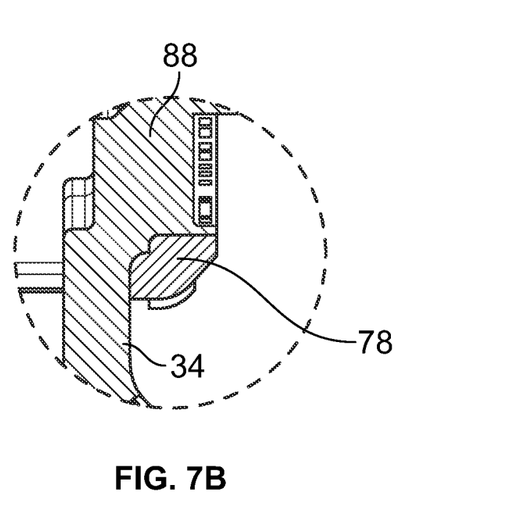
FIG. 7(b) is an enlarged partial view of detail B of FIG. 6.
Figure 8A:
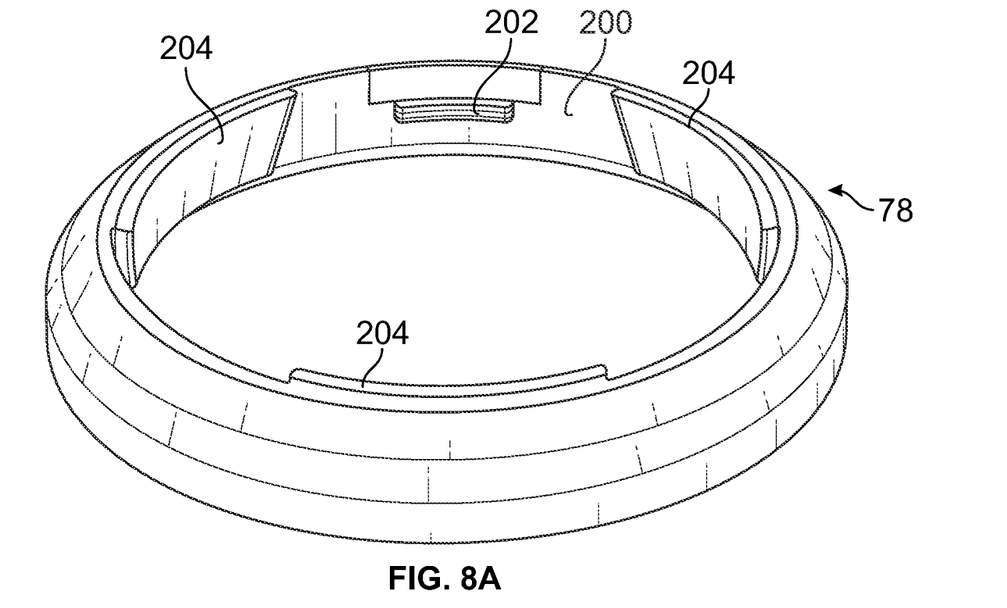
FIG. 8(a) is a perspective view of the retention ring of the vibration dampening device of FIG. 1.
Figure 8B:
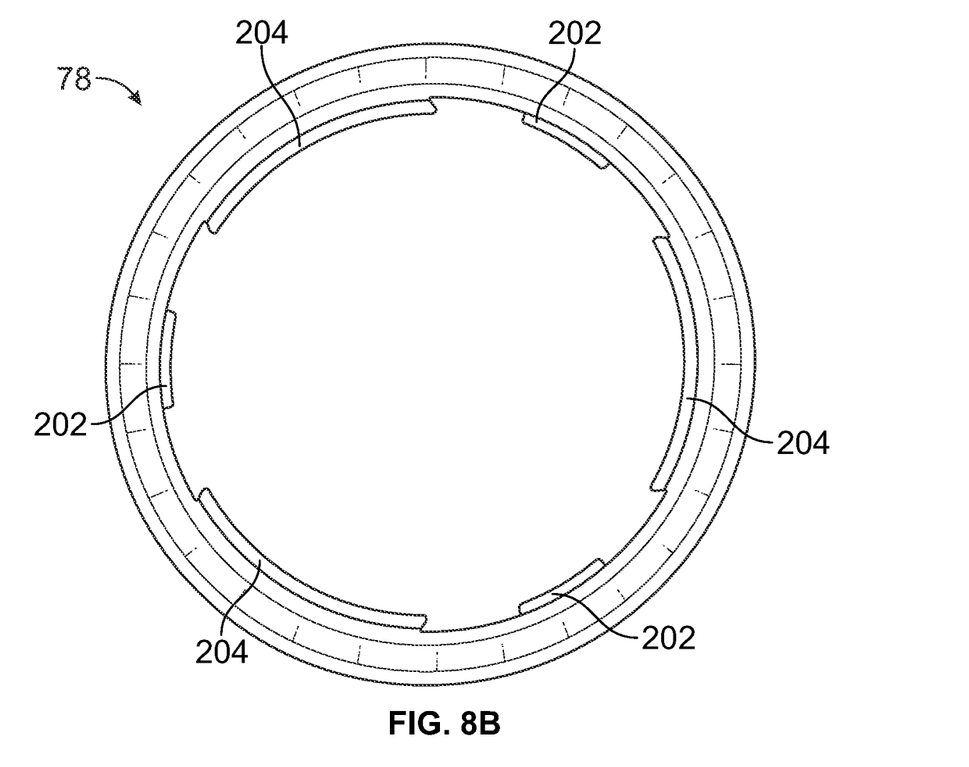
FIG. 8(b) is a top view of the retention ring of the vibration dampening device of FIG. 1.

FIGS. 1-8(b) illustrate an embodiment of a vibration dampening device 10 in accordance with an embodiment of the present disclosure for a mount for mounting a handheld electronic device to a bicycle, motorcycle or other similar device. The illustrated mount is a commercially-available mount that includes a mount head 16 including a plurality of radially-extending teeth 18 for securing to a handheld device and a base 20 that includes a clamp portion and a plurality of radially-extending teeth 22 for securing the mount to a handlebar of the bicycle, motorcycle or other similar device. The mount may have any other structure or configuration. The mount head 16 and base 20 can be any structure of any other mount and the manner of securing the device to a handheld device can occur in any other suitable manner. The mount head is securable to a handheld device by securing it to the case of the handheld device or directly to the handheld device. The illustrated vibration dampening device 10 is secured to and disposed between the mount head 16 and base 20.

The illustrated dampening device 10 comprises generally a chassis 30 having interlocking pieces 32 and 34 and three grommets 36 engaged with the first and second interlocking pieces. Interlocking piece 32 is securable to the mount head 16 of the mount in any suitable manner and the interlocking piece 34 is securable to the base 20 of the mount in any suitable manner. The interlocking piece 32 defines a center hole 40 and the interlocking piece 34 defines a center hole 42 contiguous with the center hole 40. The center holes 40 and 42 are configured to receive a fastener 44 to secure the vibration dampening device 10 to the mount. The fastener 44 may be a hex screw or any other suitable fastener. The center holes 40 and 42 define a central axis of the vibration dampening device 10.

Each of the illustrated first and second interlocking pieces 32 and 34 includes three arms 48 and 50 extending away from the axis. Each of the arms 48 and 50 includes a first portion 52 and 54 that extends away from the central axis and a second portion 55 and 56 that extends at an angle away from the mount head 16 of the mount such that each of the first and second interlocking pieces 32 and 34 have a bowl shape. Each of the arms 48 and 50 defines on its second portion a hole 58 and 60 for receiving and engaging one of the grommets 36.

The interlocking piece 32 has a top or first side 62 that faces opposite the interlocking piece 34 and includes structure for engaging the mount head 16 of the mount. The illustrated structure for engaging the mount head 16 is in the form of a bore 64 defined by a plurality of radially-extending teeth 66 for engaging the teeth 18 on the mount head 16 such that the mount can be adjusted to a desired position. The illustrated structure for engaging the base 20 is in the form of a circular protrusion 68 that includes a plurality of radially-extending teeth 70 for engaging complementary teeth 22 on the base 20 such that the base can be adjusted to a desired position. The teeth 70 define a circular opening 74 for receiving the complementary teeth 22 on the base 20. The vibration dampening device 10 may also include a retention ring 78 disposed about the circular protrusion 68 for preventing the interlocking pieces 32 and 34 from separating from each other. The retention ring 78 limits the deflection of the brackets 80 so that the brackets cannot deflect and pass entirely through the slots 92 to disengage the interlocking pieces 32 and 34. The illustrated retention ring 78 includes an internal wall 200 with three circumferentially-spaced snaps 202 and three circumferentially-spaced alignment structures 204. The protrusion 68 of the second interlocking piece 34 has three circumferentially-spaced snap tabs 210 for engaging the snaps 202. The alignment structures 204 are disposed to be positioned circumferentially between the brackets 80. The snap tabs 210 are engageable with the snaps 202 when the alignment structures 204 are aligned between the brackets 80.

The vibration dampening device 10 is secured to the mount by the fastener 44 that extends from the mount head, through the central holes 40 and 42 and to the base 20 of the mount. If desired, a threaded or non-threaded sleeve 72 can be disposed within the central holes 40 and 42 for receiving and engaging the fastener 44.

The interlocking piece 32 includes three brackets 80 spaced circumferentially approximately 120 degrees apart from each other extending parallel to the axis for engaging the second interlocking piece. The brackets 80 have flexibility and flex inward to engage the interlocking piece 34. Each bracket 80 has an arcuate cross section. The interlocking piece 32 includes a stop in the form of snap tab 82 at the base of each bracket 80 for engaging the interlocking piece 34 and limiting movement of the interlocking pieces relative to each other during movement of the interlocking pieces in opposite directions during vibration. The interlocking piece 32 includes a cylindrical projection 88 extending opposite the first side 62 receiving the sleeve 72, and three rectangular spokes 90 extending radially outward from the cylindrical projection 88 also for engaging the interlocking piece 34. The spokes 90 each have a bottom that extends toward the interlocking piece 34 farther than the cylindrical projection 88. The spokes 90 are disposed and spaced along the same radial line as the brackets and thus are also spaced about 120 degrees apart from each other. The interlocking piece 32, including each of its components, may have any other suitable construction and configuration in accordance with other embodiments of the present disclosure.

The interlocking piece 34 defines three slots 92 for receiving the brackets 80 that are also circumferentially spaced about 120 degrees apart. The brackets 80 and slots 92 permit movement of the interlocking pieces 32 and 34 relative to each other during vibration and as the interlocking pieces move away from each other the snap tabs 82 limit the movement of the interlocking pieces relative to each other. The interlocking piece 34 includes a circular wall 100 and a floor 102 that define a bore 106 disposed about the central hole 42. As the interlocking pieces 32 and 34 move toward each other during vibration, the floor 102 engages the spokes 90 to limit the movement of the interlocking pieces towards each other. The circular wall 100 defines grooves 110 for allowing rain water or the like to drain from the bore 106. The interlocking piece 34, including each of its components, may have any other construction and configuration in accordance with other embodiments of the present disclosure.

The illustrated grommets 36 may be constructed of silicone or other rubber or rubber-like material. A respective end of each grommet 36 engages a respective arm 48 or 50 of the first or second locking piece 32 or 34 by extending through a hole 112 and 114 defined by each first and second interlocking pieces 32 and 34 and engaging the respective arm. The grommets 36 can be secured or otherwise engaged with the first and second interlocking pieces 32 and 34 in any other suitable manner in accordance with other embodiments of the present disclosure.

The interlocking pieces 32 and 34 permit movement relative to each other but also limit the movement. For example, the brackets 80 permit movement of the interlocking pieces 32 and 34 relative to each other in the axial direction during vibration but the snap tabs 82 limit the movement of the interlocking pieces in a separation direction. The floor 102 engages the spokes 90 to limit the movement of the interlocking pieces 32 and 34 in the opposite direction during vibration. The retention ring 78 limits the deflection of the brackets 80 so that the brackets cannot deflect and pass entirely through the slots 92. Thus, in the illustrated embodiment, the interlocking pieces 32 and 34 can move back and forth relative to each other but during use do not separate nor do the arms 48 come in contact with arms 50. The brackets 80 and the slots 92 also limit axial rotation of the first interlocking piece 32 relative to the second interlocking piece 34.

The illustrated embodiment of the vibration dampening device 10 is intended for use in engaging the mount with complementary radially-extending teeth or any other mount that includes a clamp that can engages the chassis 30 in the same or similar manner. It thus may be securable to different types of mounts. The vibration dampening device 10 may be secured to other mounts of different constructions or configurations in any other suitable manner in accordance with other embodiments of the present disclosure. The illustrated mount head 16 can be secured to a handheld electronic device with a case having complementary radially-extending teeth or can be secured to a handheld device in any other suitable manner. The vibration dampening device 10 may be modular and thus securable to different mounts.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

We claim:

1. A vibration dampening device for a mount including a mount head and a base for mounting a handheld device, the vibration dampening device comprising:
    a chassis comprising first and second interlocking pieces configured to be disposed between the mount head and the base, the first interlocking piece configured to engage the mount head and the second interlocking piece configured to engage the base, one of the first and second interlocking pieces including a plurality of brackets, and the other of the first and second interlocking pieces including a plurality of slots for receiving the brackets, the first and second interlocking pieces moveable relative to each other along the brackets, the chassis further comprising a stop for limiting movement of the first and second interlocking pieces relative to each other and a retention ring for limiting deflection of the brackets relative to the slots; and
    at least one vibration dampening grommet engaged with the first and second interlocking pieces to provide dampening of vibrations incurred by the mount.

2. The vibration dampening device of claim 1 wherein there are a plurality of vibration dampening grommets and wherein each of the first and second interlocking pieces includes a plurality of arms, one of the grommets engaged with one of the arms of the first interlocking piece and one of the arms of the second interlocking piece and another of the grommets engaged with another of the arms of the first interlocking piece and another of the arms of the second interlocking piece.

3. The vibration dampening device of claim 1 wherein the stop comprises a plurality of snap tabs, each snap tab disposed on a respective bracket for engaging the other of the first and second interlocking pieces to limit movement of the interlocking pieces relative to each other during movement of the interlocking pieces in opposite directions.

4. The vibration dampening device of claim 1 wherein one of the first and second interlocking pieces defines a first hole for receiving a fastener and the other of the first and second interlocking pieces defines a second hole concentric with the first hole for receiving the fastener, the first and second holes defining an axis, the brackets extending parallel to the axis.

5. The vibration dampening device of claim 4 wherein one of the first and second interlocking pieces includes a spoke and the other of the first and second interlocking pieces includes a floor defining a bore to receive the spoke for limiting the movement of the first and second interlocking pieces relative to each other, the stop and the floor limiting movement of the first and second interlocking pieces relative to each other, wherein the spoke extends radially away from the axis.

6. The vibration dampening device of claim 1 wherein each of the first and second interlocking pieces includes three arms and wherein there are three grommets, each grommet engaged with a respective one of the arms of the first interlocking piece and a respective one of the arms of the second interlocking piece.

7. The vibration dampening device of claim 6 wherein the stop comprises a plurality of snap tabs, each snap tab disposed on a respective one of the brackets.

8. The vibration dampening device of claim 1 wherein there are three brackets, the brackets being spaced 120 degrees apart from each other.

9. The vibration dampening device of claim 1 wherein a protrusion extends from the one of the first and second interlocking pieces including the plurality of slots away from the other of the first and second interlocking pieces, and wherein the retention ring includes a plurality of circumferentially-spaced snaps for engaging the protrusion.

10. The vibration dampening device of claim 9 wherein the retention ring has a plurality of circumferentially-spaced alignment structures for positioning the retention ring relative to the protrusion.

11. A vibration dampening device comprising:
    a chassis comprising first and second interlocking pieces aligned along an axis, the first interlocking piece including a first plurality of arms extending radially away from the axis and a plurality of brackets extending parallel to the axis, the second interlocking piece including a second plurality of arms extending radially away from the axis, a plurality of slots, and a protrusion extending away from the first interlocking piece, the first and second interlocking pieces moveable relative to each other along the brackets;
    a plurality of vibration dampening grommets, each grommet engaged with a respective one of the first plurality of arms and a respective one of the second plurality of arms; and
    a retention ring,
    wherein the plurality of brackets extend through the plurality of slots to couple the first interlocking piece with the second interlocking piece,
    wherein a plurality of snap tabs is configured to provide a stop for limiting movement of the first interlocking piece away from the second interlocking piece, each snap tab disposed on a respective bracket for engaging the second interlocking piece,
    wherein the retention ring is engaged with the protrusion and configured to limit deflection of the brackets relative to the slots to block the snap tabs from passing through the slots in order to retain the first interlocking piece on the second interlocking piece, and
    wherein the plurality of vibration dampening grommets is configured to provide dampening of vibrations incurred by the first interlocking piece or second interlocking piece.

12. The vibration dampening device of claim 11 wherein the first interlocking piece further includes a projection extending toward the second interlocking piece and a plurality of spokes extending radially from the projection, wherein the second interlocking piece defines a floor, and wherein the spokes are configured to engage with the floor to limit movement of the first interlocking piece toward the second interlocking piece.

13. The vibration dampening device of claim 11 wherein the first plurality of arms includes three arms, wherein the second plurality of arms includes three arms, and wherein the plurality of grommets includes three grommets.

14. The vibration dampening device of claim 13 wherein the plurality of brackets includes three brackets, and wherein the plurality of slots includes three slots.

15. The vibration dampening device of claim 11 wherein the retention ring includes a plurality of snaps for engaging the protrusion.

16. The vibration dampening device of claim 15 wherein the retention ring has a plurality of alignment structures for positioning the retention ring relative to the protrusion.

17. A vibration dampening device comprising:
   a chassis comprising first and second interlocking pieces aligned along an axis, the first interlocking piece including a plurality of brackets extending parallel to the axis, the second interlocking piece including a plurality of slots and a protrusion extending away from the first interlocking piece, the first and second interlocking pieces moveable relative to each other along the brackets;
   a plurality of vibration dampening grommets, each grommet engaged between the first and second interlocking pieces; and
   a retention ring,
   wherein the plurality of brackets extend through the plurality of slots to couple the first interlocking piece with the second interlocking piece,
   wherein a plurality of snap tabs is configured to provide a stop for limiting movement of the first interlocking piece away from the second interlocking piece, each snap tab disposed on a respective bracket for engaging the second interlocking piece,
   wherein the retention ring is engaged with the protrusion and configured to limit deflection of the brackets relative to the slots to block the snap tabs from passing through the slots in order to retain the first interlocking piece on the second interlocking piece, and
   wherein the plurality of vibration dampening grommets is configured to provide dampening of vibrations incurred by the first interlocking piece or second interlocking piece.

18. The vibration dampening device of claim 17 wherein the plurality of brackets includes three brackets spaced 120 degrees apart, and wherein the plurality of slots includes three slots.

19. The vibration dampening device of claim 17 wherein the first interlocking piece further includes a projection extending toward the second interlocking piece and a plurality of spokes extending radially from the projection, wherein the second interlocking piece defines a floor, and wherein the spokes are configured to engage with the floor to limit movement of the first interlocking piece toward the second interlocking piece.

20. The vibration dampening device of claim 19 wherein the plurality of spokes includes three spokes spaced 120 degrees apart.

21. The vibration dampening device of claim 17 wherein the plurality of grommets includes three grommets.

22. The vibration dampening device of claim 17 wherein the retention ring includes a plurality of circumferentially-spaced snaps for engaging the protrusion.

23. The vibration dampening device of claim 22 wherein the retention ring has a plurality of circumferentially-spaced alignment structures for positioning the retention ring relative to the protrusion.

24. The vibration dampening device of claim 17 wherein the first interlocking piece includes a first plurality of teeth extending radially away from the axis to engage a mount head at alternative positions for positioning the vibration dampening device at a desired position relative to the mount head, and wherein the second interlocking piece includes a plurality of teeth extending radially away from the axis to engage a base at alternative positions for positioning the vibration dampening device at a desired position relative to the base.

* * * * *